(12) United States Patent
Tanaka

(10) Patent No.: US 8,320,026 B2
(45) Date of Patent: Nov. 27, 2012

(54) IMAGE READING APPARATUS AND IMAGE FORMING APPARATUS WITH A CONTROL DEVICE FOR ADJUSTING A WHITE REFERENCE MEMBER TO A SET POSITION ACCORDING TO SHADING CORRECTION OR IMAGE READING OPERATION

(75) Inventor: Koichi Tanaka, Osaka (JP)

(73) Assignee: Kyocera Document Solutions Inc. (JP)

( * ) Notice: Subject to any disclaimer, the term of this patent is extended or adjusted under 35 U.S.C. 154(b) by 518 days.

(21) Appl. No.: 12/356,228

(22) Filed: Jan. 20, 2009

(65) Prior Publication Data
US 2009/0185237 A1 Jul. 23, 2009

(30) Foreign Application Priority Data
Jan. 22, 2008 (JP) .................................. 2008-011477

(51) Int. Cl.
*H04N 1/40* (2006.01)
(52) U.S. Cl. ........ 358/461; 358/474; 358/497; 358/498; 382/274
(58) Field of Classification Search ........................ None
See application file for complete search history.

(56) References Cited

U.S. PATENT DOCUMENTS

| | | | | |
|---|---|---|---|---|
| 5,101,284 A * | 3/1992 | Tanabe | | 358/461 |
| 5,867,283 A * | 2/1999 | Nam | | 358/498 |
| 6,295,140 B1 * | 9/2001 | Kameyama | | 358/461 |
| 6,989,915 B2 * | 1/2006 | Honjo et al. | | 358/461 |
| 7,327,502 B2 * | 2/2008 | Sheng | | 358/498 |
| 7,379,216 B2 * | 5/2008 | Yang | | 358/461 |
| 7,385,735 B2 * | 6/2008 | Makino et al. | | 358/496 |
| 7,414,763 B2 * | 8/2008 | Jo | | 358/498 |
| 7,433,097 B2 * | 10/2008 | Spears | | 358/504 |
| 7,619,785 B2 * | 11/2009 | Sodeura et al. | | 358/474 |
| 7,755,813 B2 * | 7/2010 | Nishikawa et al. | | 358/497 |
| 7,782,505 B2 * | 8/2010 | Morita et al. | | 358/498 |
| 7,812,975 B2 * | 10/2010 | Onuma | | 358/1.12 |
| 2002/0054374 A1 * | 5/2002 | Inoue et al. | | 358/461 |
| 2004/0179242 A1 * | 9/2004 | Nakaya | | 358/461 |
| 2005/0141055 A1 * | 6/2005 | Sheng | | 358/498 |
| 2006/0087701 A1 * | 4/2006 | Onuma | | 358/461 |

FOREIGN PATENT DOCUMENTS

| | | |
|---|---|---|
| JP | 7-107283 | 4/1995 |
| JP | 2004-320331 | 11/2004 |

* cited by examiner

*Primary Examiner* — Dung Tran
(74) *Attorney, Agent, or Firm* — Ostrolenk Faber LLP

(57) ABSTRACT

An image reading apparatus including: an image sensor unit having a light source that irradiates light onto an original document transferred to a predetermined image reading position, and a light receiving element that receives reflected light of the light; a white reference member for shading correction, provided so as to oppose the image sensor unit across a transferring path for the original document; an actuator that adjusts a position or an angle of the white reference member; and a control device that sets a position or angle of the white reference member and controls the actuator so as to adjust the white reference member to the set position or to the set angle, so that light reflected from the white reference member is received on the light receiving element when correcting shading, and so that the reflected light is not received on the light receiving element when reading an image.

4 Claims, 5 Drawing Sheets

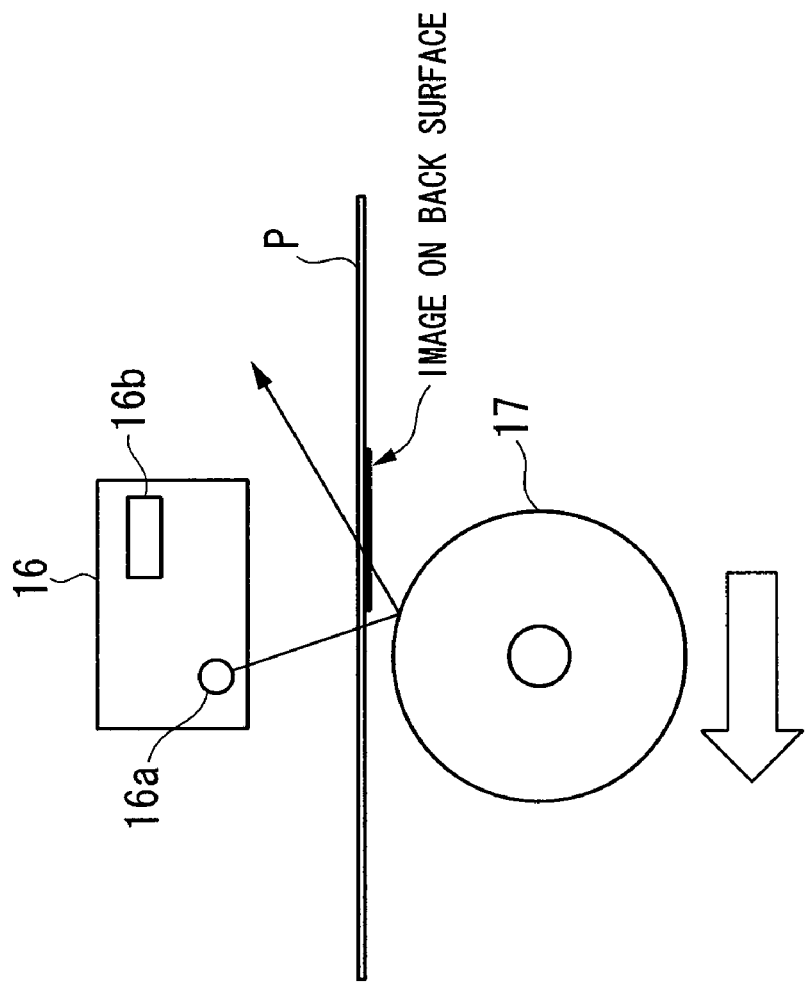
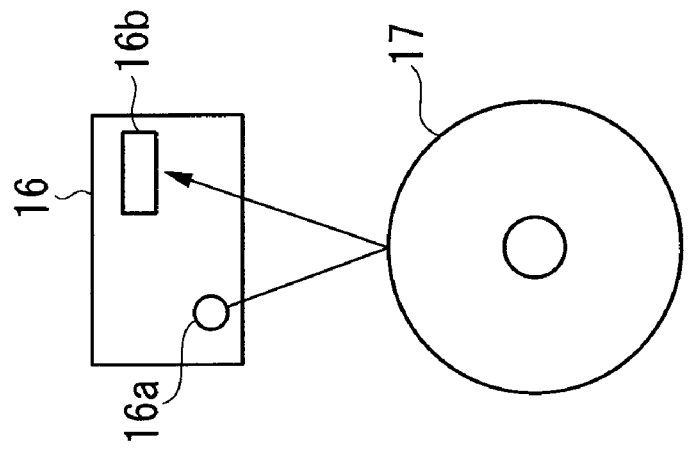

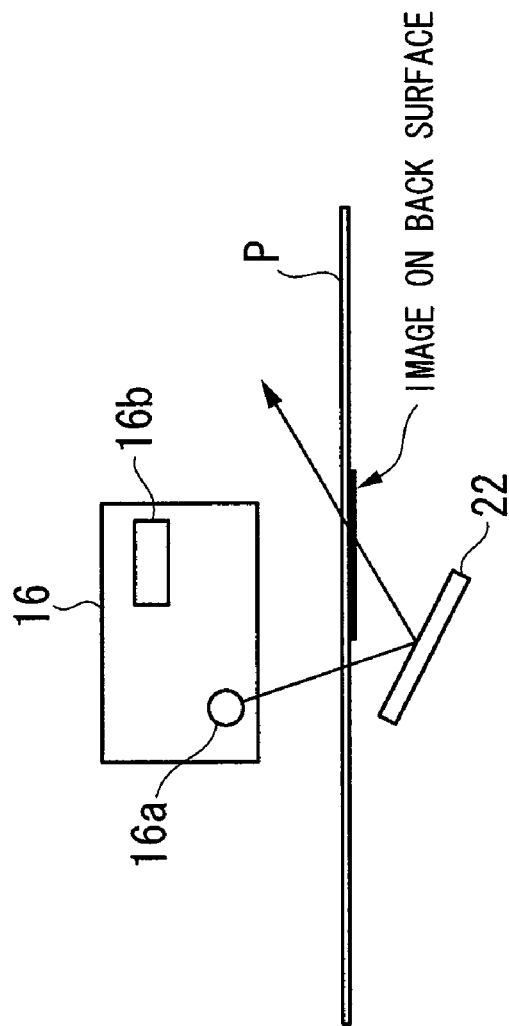
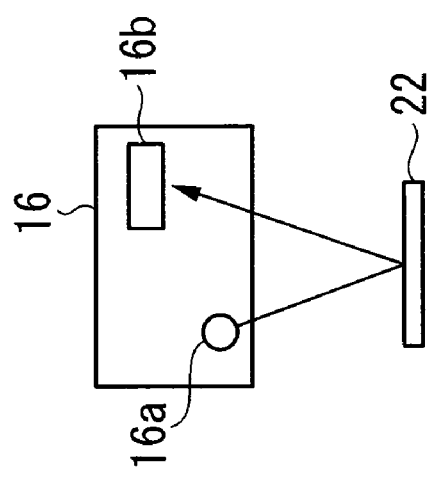

IMAGE READING APPARATUS AND IMAGE FORMING APPARATUS WITH A CONTROL DEVICE FOR ADJUSTING A WHITE REFERENCE MEMBER TO A SET POSITION ACCORDING TO SHADING CORRECTION OR IMAGE READING OPERATION

Priority is claimed on Japanese Patent Application No. 2008-011477, filed Jan. 22, 2008, the contents of which are incorporated herein by reference.

BACKGROUND OF THE INVENTION

1. Field of the Invention

The present invention relates to an image reading apparatus that reads an image printed on an original document, and an image forming apparatus provided with the image reading apparatus.

2. Description of the Related Art

For example, Japanese Unexamined Patent Application, First Publication No. 2004-320331 discloses a technique for an image reading apparatus that reads an image printed on an original document, for preventing "show-through" (a phenomenon, in which an image on the back surface appears in an image on the front surface) that occurs when reading an original document with printing on both sides. The image reading apparatus disclosed on this patent document is provided with: an image reading unit including a light source, a mirror, a lens, and a CCD (charge coupled device) element; and a transparent platen roller that is arranged so as to oppose to the image reading unit and clamp the original document, and that is provided on the inside with a cylinder-shaped background plate sectioned along the circumferential direction into two areas, namely a white area and a black area. In this image reading apparatus, when reading an original document with printing on one side, the transparent platen roller is rotated so that the white area thereof faces the image reading unit side, and on the other hand, when reading an original document with printing on both sides, the transparent platen roller is rotated so that the black area faces the image reading unit side. According to the above technique, an original document with printing on one side can be read with an excellent level of contrast, and an original document with printing on both sides can be read with no show-through.

Incidentally, as image reading methods used in an image reading apparatus, as disclosed in the above patent document, there are widely known: the CCD method in which among the light irradiated from the light source onto an original document, reflected light from the original document is received on a CCD element via an optical system including a mirror and a lens; and the CIS method in which reflected light acquired by irradiating light of three colors, namely red, green and blue, from a LED light source onto an original document, is received on a CIS (contact image sensor) element.

In an image reading apparatus that employs the conventional CIS method, as shown in FIG. 5, a CIS unit 100 (image sensor unit including a LED light source 100a and a CIS element 100b) and an original document transfer roller 200, which also serves as a white reference member for shading correction, are arranged opposed to each other. An original document P set in a paper feed tray is automatically transferred between the CIS unit 100 and the original document transfer roller 200, and an image printed on the original document P is thereby read.

In an image reading apparatus of this type, there has been problem in that when reading an image on the front surface of the original document P with printing on both sides, as shown in FIG. 5, the illumination light of the LED light source 100a transmitted through the original document P is reflected on the original document transfer roller 200 and enters the CIS element 100b, resulting in an image on the back surface of the original document P appearing in the image on the front surface.

In the case where the technique of the above patent document is employed in order to solve this kind of problem, in the original document transfer roller 200 there is provided a cylinder-shaped background plate sectioned along the circumferential direction thereof into two areas, namely a white area and a black area. However, the original document transfer roller 200 serves as a white reference member for shading correction, while also serving as a roller for transferring original documents. Therefore, there is a need for performing complex control to rotate the original document transfer roller 200 to transfer the original document P, and so that when correcting shading, the white area faces the CIS unit 100 side, and when reading the image, the black area faces the CIS unit 100 side. Furthermore, during transferring of the original document P, the original document transfer roller 200 must be rotated so that the white area does not face the CIS unit 100 side. Therefore, it is necessary to make the diameter of the original document transfer roller 200 greater (the circumferential direction length needs to be made longer). It is structurally difficult to actually realize such an image reading apparatus (due to an increase in the scale of the apparatus).

The present invention takes the above circumstances into consideration with an object of providing an image reading apparatus that is capable, with a simple control and structure, of suppressing the occurrence of the show-through phenomenon, and an image forming apparatus provided with the image reading apparatus.

SUMMARY OF THE INVENTION

In order to achieve the above object, the present invention employs the following measures. Namely, the present invention employs an image reading apparatus including: an image sensor unit having a light source that irradiates illumination light onto an original document transferred to a predetermined image reading position, and a light receiving element that receives reflected light of the illumination light; a white reference member for shading correction, provided so as to oppose the image sensor unit across a transferring path for the original document; an actuator that adjusts a position of the white reference member in a direction of transferring the original document, or an angle of the white reference member; and a control device that sets a position or angle of the white reference member and controls the actuator so as to adjust the white reference member to the set position or to the set angle, so that light reflected from the white reference member among the illumination light is received on the light receiving element when correcting shading, and so that the reflected light is not received on the light receiving element when reading an image.

It may be arranged such that the white reference member is a cylinder-shaped roller that transfers the original document; and the control device controls the actuator so as to adjust a position of the roller.

It may be arranged such that the white reference member is a plate-shaped white reference plate; and the control device controls the actuator so as to adjust an angle of the white reference plate.

It may be arranged such that the light receiving element is a CIS (contact image sensor) element.

It may also be arranged such that the light receiving element is a CCD (charge coupled device) element.

Furthermore, the image forming apparatus of the present invention is an image forming apparatus provided with an image reading apparatus according to the above image reading apparatus, wherein an image is formed on a paper, based on image data of an original document that has been read by the image reading apparatus.

According to the above image reading apparatus and the image forming apparatus, by only controlling the position or angle of the white reference member, it is possible to have the reflected light from the white reference member among the illumination light, be received on the light receiving element when correcting shading, and it is also possible to have the reflected light not be received on the light receiving element when reading an image. Furthermore, it is possible to realize such control with an actuator that adjusts the position of the white reference member in the direction of the original document transferring, or the angle of the white reference member with respect to the direction of the original document transferring.

That is to say, according to the image reading apparatus and the image forming apparatus, with a simple control and structure, it is possible to suppress the occurrence of the show-through phenomenon.

BRIEF DESCRIPTION OF THE DRAWINGS

FIG. 2A and FIG. 2B are drawings for explaining operations of the image reading apparatus 10 according to the same embodiment.

FIG. 3A and FIG. 3B show a modified example of the image reading apparatus 10 according to the same embodiment.

DETAILED DESCRIPTION OF THE INVENTION

Hereunder, is a detailed description of an embodiment of an image reading apparatus and an image forming apparatus according to the present invention with reference to the drawings.

[Image Reading Apparatus]

Figure 1:
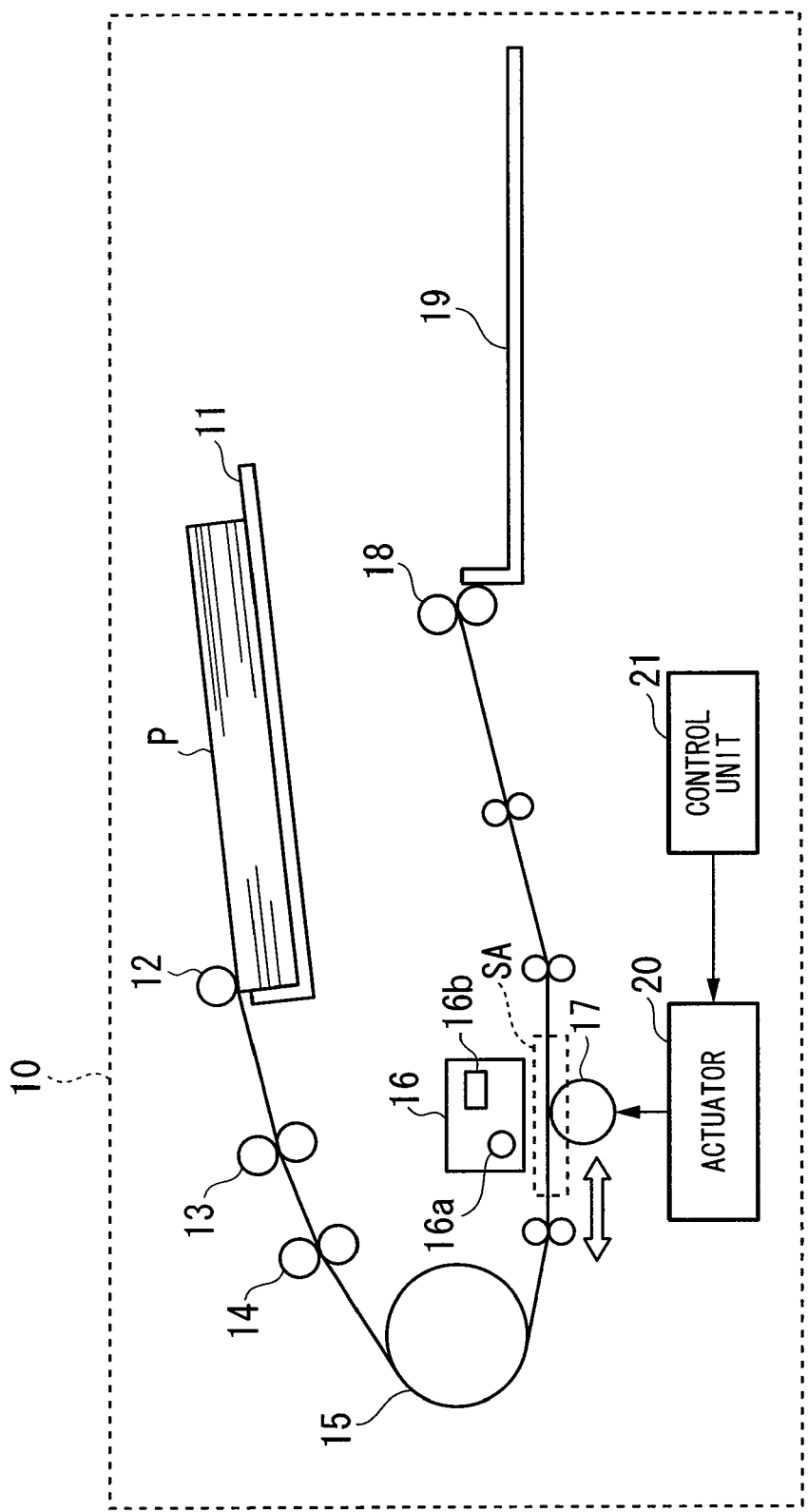
FIG. 1 is a schematic configuration drawing of an image reading apparatus 10 according to an embodiment of the present invention.

FIG. 1 is a schematic configuration drawing of an image reading apparatus 10 according to the present embodiment. As shown in this FIG. 1, the image reading apparatus 10 according to the present embodiment includes; a paper feed tray 11, a paper feed roller 12, a separating roller 13, a resist roller 14, a platen roller 15, an image sensor unit 16, an original document transfer roller 17, a paper discharge roller 18, a paper discharge tray 19, an actuator 20, and a control unit 21.

The paper feed tray 11 is a tray, on which a reading target original document P is to be loaded. The paper feed roller 12 feeds the original document P loaded on the paper feed tray 11 sequentially from the top most section side to the separating roller 13. The separating roller 13 is a roller for preventing multi-feeding, and transfers the original document P having been fed from the paper feed roller 12 to the resist roller 14 one by one. The resist roller 14 adjusts the orientation of the original document P being transferred from the separating roller 13, and transfers it to the platen roller 15. The platen roller 15 transfers the original document P transferred from the resist roller 14 to an image reading position SA.

In the image reading position SA, there are installed the image sensor unit 16 and the original document transfer roller 17 so as to oppose each other. The image sensor unit 16 has a LED light source 16a that irradiates illumination light onto the original document P transferred to the image reading position SA, and a CIS element 16b that receives the illumination light reflected by the original document P. The image sensor unit 16 reads an image on one surface of the original document P (the surface with printing of the reading target image: hereunder, this surface is referred to as the reading target surface), and an electric signal that represents the image of the reading target surface is output from the CIS element 16b to the control unit 21.

The original document transfer roller 17 is a cylinder-shaped roller that serves as a white reference member for shading correction, and that also serves as a transfer roller for the original document P, and is provided on the opposite side to the image sensor unit 16 across the original document P (on the back surface side of the reading target surface). This original document transfer roller 17 is installed while being movable along the direction of transferring the original document P. The paper discharge roller 18 discharges the original document P transferred from the original document transfer roller 17 to the paper discharge tray 19. The paper discharge tray 19 is a tray for storing the original document P that has been subjected to image reading and has been discharged from the paper discharge tray 19.

The actuator 20 is an actuator that adjusts, under control from the control unit 21, the position of the original document transfer roller 17 in the direction of transferring the original document P, and is configured for example with a motor, a solenoid, or the like. The control unit 21 generates, based on voltage signals output from the image sensor unit 16 (specifically, the CIS element 16b), image data of the reading target surface of the original document P. Moreover, leaving details to be described later, when correcting shading, this control unit 21, as a characteristic operation in the present embodiment, sets the position of the original document transfer roller 17 so that reflected light from the original document transfer roller 17 among the illumination light from the LED light source 16a is received on the CIS element 16b, and controls the actuator 20 so as to adjust the original document transfer roller 17 to the set position. Moreover, when image-reading, the control unit 21 sets the position of the original document transfer roller 17 so that the reflected light is not received on the CIS element 16b, and controls the actuator 20 so as to adjust the original document transfer roller 17 to the set position.

Next, operation of the image reading apparatus 10 according to the present invention configured as described above, is described with reference to FIG. 2A and FIG. 2B. FIG. 2A shows the position of the original document transfer roller 17 when correcting shading, and FIG. 2B shows the position of the original document transfer roller 17 when image-reading.

As shown in FIG. 2A, at the time of shading correction which is executed prior to image reading, the control unit 21 sets the position of the original document transfer roller 17 so that reflected light that occurs as a result of the illumination light from the LED light source 16a being reflected by the original document transfer roller 17, is received by the CIS element 16b, and controls the actuator 20 so as to adjust the original document transfer roller 17 to the set position. As a result, the reflected light from the original document transfer roller 17 can be received on the CIS element 16b as a white reference required for shading correction processing, and therefore the shading correction processing can be executed with no problems.

On the other hand, as shown in FIG. 2B, at the time of image reading after shading correction, the control unit 21 sets the position of the original document transfer roller 17 so that reflected light, which occurs as a result of the illumination light from the LED light source 16a being reflected by the original document transfer roller 17, is not received on the CIS element 16b, and controls the actuator 20 so as to adjust the original document transfer roller 17 to the set position. The original document transfer roller 17 is of a cylinder shape, and therefore the reflection angle of the illumination light can be increased by displacing the position of the original document transfer roller 17 in the direction of transferring the original document P. As a result, it is possible to have the light reflected by the original document transfer roller 17 (reflected light from the back surface side of the original document P) not be received on the CIS element 16b.

That is to say, at the time of image reading, only the light reflected on the reading target surface of the original document P among the illumination light is received on the CIS element 16b, and the reflected light from the back surface side of the original document P is not received on the CIS element 16b. Therefore, it is possible to suppress the occurrence of the show-through phenomenon in the case where the original document P is an original document with printing on both sides.

In this manner, according to the image reading apparatus 10 of the present embodiment, by only controlling the position of the original document transfer roller 17, it is possible to have light reflected from the original document transfer roller 17 among the illumination light, be received on the CIS element 16b when correcting shading, and it is also possible to have the reflected light not be received on the CIS element 16b when reading an image. Moreover, this control may be realized with an actuator. That is to say, according to the image reading apparatus 10 of the present embodiment, with a simple control and structure, it is possible to suppress the occurrence of the show-through phenomenon.

In the above embodiment, there has been shown an example of a case where the original document transfer roller 17, which also serves the role of transferring original documents, is used as a white reference member for shading correction. However, the invention is not limited to this. For example, a plate-shaped white reference plate may be used as a white reference member for shading correction. In the case where such a white reference plate is used as a white reference member, then when correcting shading, as shown in FIG. 3A, the control unit 21 is given a function for setting the angle of the white reference plate 22 (set parallel to the transferring direction in the example of the drawing) so as to have the light reflected from the white reference plate 22 among the illumination light from the LED light source 16a, be received on the CIS element 16b. Moreover, when reading an image, as shown in FIG. 3B, the control unit 21 is given a function for setting the angle of the white reference plate 22 so as to have the light reflected on the white reference plate 22 not be received on the CIS element 16b.

In this manner, as a white reference member, a roller-shaped white reference member that also serves the role of transferring original documents (original document transfer roller 17), or a plate-shaped white reference member (white reference plate 22) may be used. In particular, in a roller-shaped white reference member, a minute parallel motion would cause a significant change in the reflection angle of the illumination light. Therefore, it is superior to a plate-shaped white reference member from the aspect of having hardly any change in the paper transferring path.

Moreover, in the above embodiment, there has been described an example of the image reading apparatus 10 that uses the CIS element 16b as a light receiving element in the image sensor unit 16 (that is, an image reading apparatus that employs the CIS method). However, the present invention is also applicable to an image reading apparatus with the CCD method that uses a CCD element as this light receiving element.

[Image Forming Apparatus]

Next, an image forming apparatus 50 provided with the above described image reading apparatus 10, is described.

Figure 4:
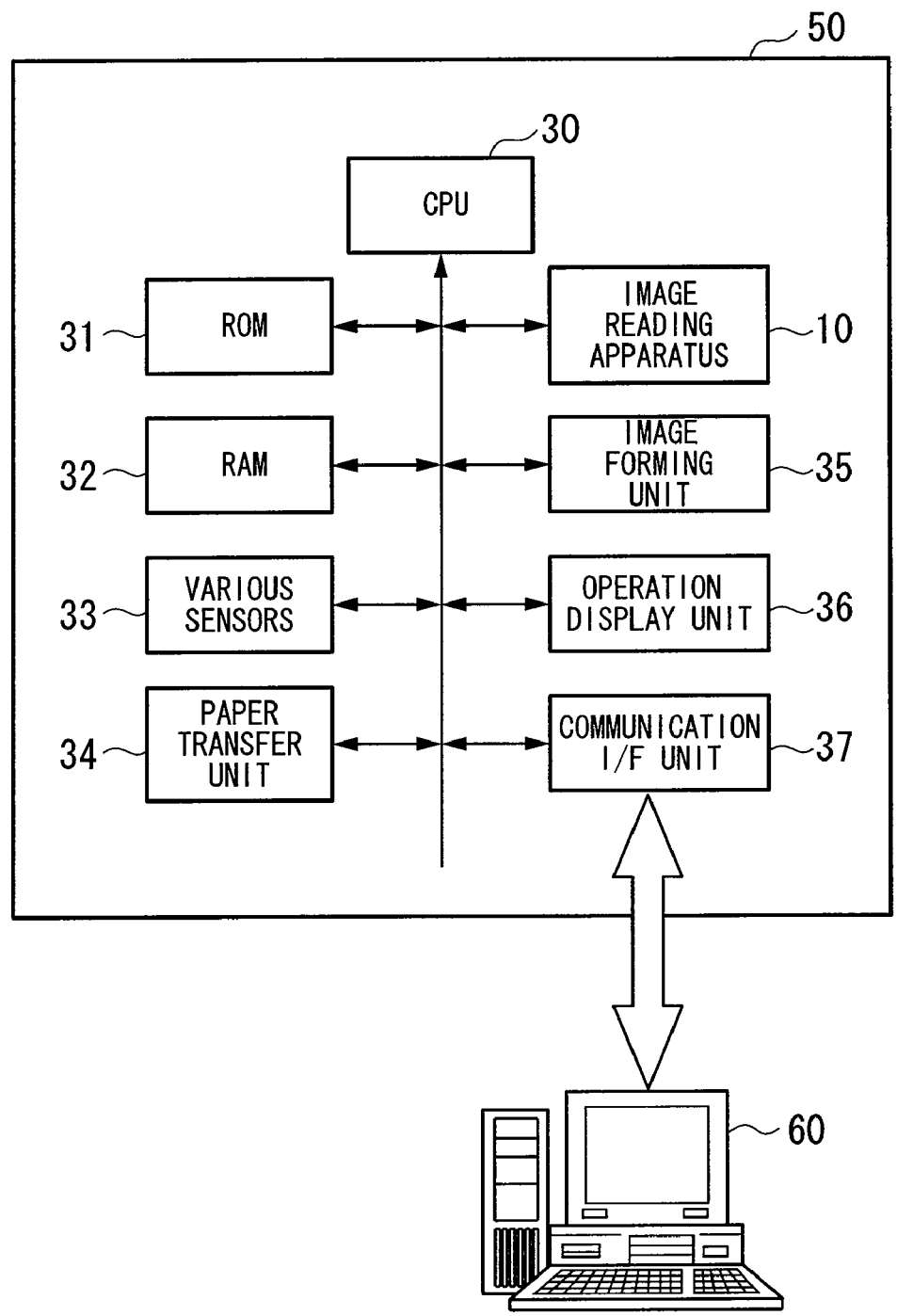
FIG. 4 is a functional block diagram of the image forming apparatus 50 according to the same embodiment.
Figure 5:
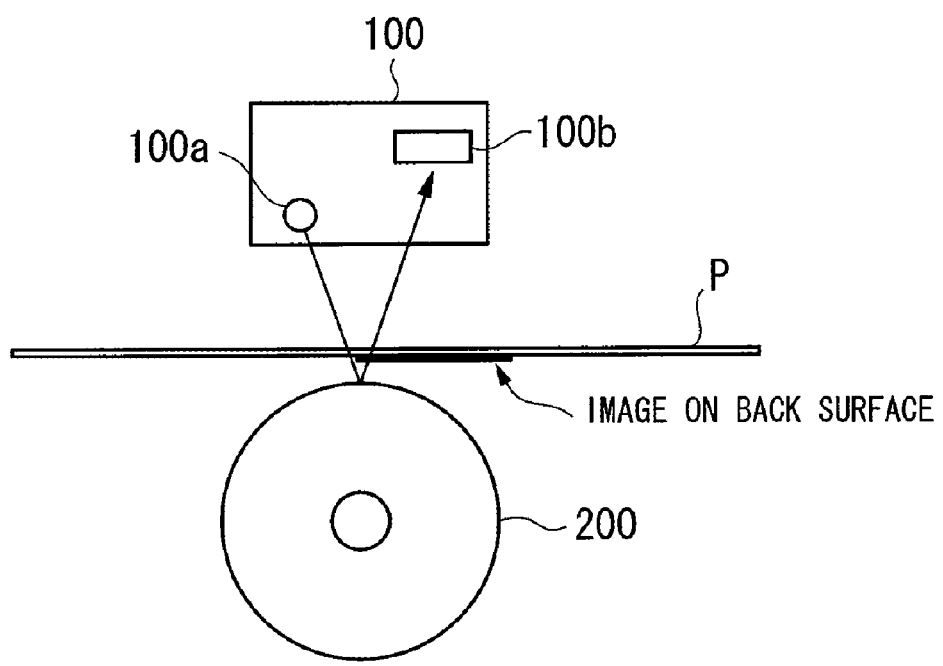
FIG. 5 is an explanatory drawing of an image reading apparatus that employs the conventional CIS method.

FIG. 4 is a functional block diagram of the image forming apparatus 50 according to the present embodiment. The image forming apparatus according to the present embodiment is a compound machine having for example, functions of a copying machine and a printer, and in addition to the image reading apparatus 10, is provided with a CPU (central processing unit) 30, a ROM (read only memory) 31, a RAM (random access memory) 32, various sensors 33, a paper transfer unit 34, an image forming unit 35, an operation display unit 36, and a communication I/F unit 37. Reference symbol 60 denotes a PC (personal computer) for externally giving printing instructions to the image forming apparatus 50.

The CPU 30 executes a control program stored in the ROM 31, and controls overall operations of the image forming apparatus 50 based on; image data of original documents read by the image reading apparatus 10, detection signals output from the various sensors 33, operation signals output from the operation display unit 36, and printing instruction signals and image data for printing received from the PC 60 via the communication I/F unit 37.

The ROM 31 is a non-volatile memory that stores the control program to be used by the CPU 30, and other data. The RAM 32 is a working memory to be used as a temporary data saving destination when the CPU 30 executes the control program to perform various calculation processing. The various sensors 33 are various types of sensors required for image forming operations such as; an out-of-paper detection sensor, a paper position detection sensor, and a temperature sensor, and they output respectively detected various types of information to the CPU 30 as detection signals. The paper transfer unit 34 includes; a transfer roller for transferring paper stored in a paper tray (not shown in the drawing) to the image forming unit 35 and a motor for driving the transfer roller, and a transfer roller for transferring paper that has been subjected to the image forming process to a paper discharge tray (not shown in the drawing) and a motor for driving the transfer roller.

The image forming unit 35, under control of the CPU 30, based on image data generated by the image reading apparatus 10 and image data for printing received from the PC 60, transfers a toner image onto a paper transferred from the paper transfer unit 34, and performs a fixing process for the toner image (image forming). The operation display unit 36 includes, for example, a touch panel, and under control of the CPU 30, displays a screen that informs various types of operation keys and various types of information, and outputs operation input information of the various types of operation keys displayed on the touch panel to the CPU 30 as operation signals. The communication I/F unit 37 is an interface for performing communication between the image forming apparatus 50 (more specifically, the CPU 30) and the external PC 60, and is connected to the PC 60 through a network such as a LAN (local area network).

According to such an image forming apparatus 50 provided with the image reading apparatus 10 of the present embodiment, even in the case where an original document with printing on both sides is read, it is possible to form images with no show-through, on a printing paper.

In the above embodiment, a compound machine has been described as an example of the image forming apparatus 50 provided with the image reading apparatus 10. However, in addition, an image forming apparatus such as a copying machine (copier) and a facsimile may be provided with the image reading apparatus 10 according to the present embodiment.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image reading apparatus comprising:
   an image sensor unit comprising a light source configured to irradiate illumination light onto an original document transferred to a predetermined image reading position, and a light receiving element configured to receive reflected light of said illumination light;
   a white reference member configured to perform shading correction, and provided so as to oppose said image sensor unit across a transferring path for said original document;
   an actuator configured to adjust a position of said white reference member in a direction of transferring said original document or to adjust an angle of said white reference member; and
   a control device configured to set a first position and a second position of said white reference member and to control said actuator so as to adjust said white reference member to said first position in which light reflected from said white reference member of said illumination light is received on said light receiving element when correcting shading, and configured to control said actuator so as to adjust said white reference member to said second position in which light reflected from said white reference member is not received on said light receiving element when reading an image,
   wherein said white reference member is a cylinder-shaped roller that transfers said original document; and
   said control device controls said actuator so as to adjust a position of said cylinder-shaped roller by displacing said roller from the first position to the second position along the direction of transferring said original document.

2. An image reading apparatus according to claim 1, wherein said light receiving element is a contact image sensor element.

3. An image reading apparatus according to claim 1, wherein said light receiving element is a CCD charge coupled device element.

4. An image forming apparatus comprising the image reading apparatus according to claim 1, wherein an image is formed on a paper medium based on image data of the original document read by said image reading apparatus.

* * * * *